United States Patent [19]

Takahasi et al.

[11] Patent Number: 4,531,418
[45] Date of Patent: Jul. 30, 1985

[54] TOTALLY SYNCHRONIZED MANUAL TRANSMISSION UNITS FOR USE IN A VEHICLE

[75] Inventors: Yasuie Takahasi; Shozi Haga, both of Toyota, Japan

[73] Assignee: Toyota Jidosha Kabushiki Kaisha, Japan

[21] Appl. No.: 532,480

[22] Filed: Sep. 15, 1983

[30] Foreign Application Priority Data

Nov. 1, 1982 [JP] Japan ............................ 57-166865[U]

[51] Int. Cl.³ ............................................. F16H 3/38
[52] U.S. Cl. ...................................... 74/339; 74/475; 74/477
[58] Field of Search ........................ 74/475, 477, 339

[56] References Cited

U.S. PATENT DOCUMENTS

| | | | |
|---|---|---|---|
| 1,886,154 | 11/1932 | Bixby | 74/475 X |
| 2,951,392 | 9/1960 | Backus | 74/475 X |
| 3,479,900 | 11/1969 | Mays | 74/475 X |
| 4,373,403 | 2/1983 | Malott et al. | 74/477 X |
| 4,476,739 | 10/1984 | Arai et al. | 74/475 |
| 4,483,213 | 11/1984 | Takahasi | 74/475 |
| 4,774,644 | 11/1979 | Nagy et al. | 74/475 X |

Primary Examiner—William E. Tapolcai
Attorney, Agent, or Firm—Parkhurst & Oliff

[57] ABSTRACT

A gear-shift mechanism for a transmission unit which includes a fork shaft slidably supported in a housing assembly which is selectively shifted from its neutral position to forward and reverse positions, a detent mechanism for selectively retaining the fork shaft in its neutral and shifted positions, a shift head member slidable on the fork shaft, a one-way engagement mechanism for effecting the engagement between the shift head member and the fork shaft during axial displacement of the fork shaft toward and away from its reverse position, and a shift arm member pivotably mounted to the inner wall structure of the housing assembly and linked with the shift head member to retain an idler gear in its neutral position and engage the same with driving and driven gears. The detent mechanism includes a holder member having a slot in its upper portion and a shaft fixed to the upper side portion of the holder member. The head portion of the shaft fixed to the holder member can be engaged with another head portion provided at a select return spring holder.

6 Claims, 11 Drawing Figures

TOTALLY SYNCHRONIZED MANUAL TRANSMISSION UNITS FOR USE IN A VEHICLE

BACKGROUND OF THE INVENTION

The present invention relates to a manual transmission unit for use in a vehicle, and more particularly to an improvement in the manual transmission units possessing synchronizers and at least one unsynchronized gear, such as reverse.

A widely known manual transmission has input and output shafts supported in a parallel relationship to each other within a housing assembly for the unit, an idler shaft supported in a parallel relationship with the shafts from the housing assembly, driving and driven gears respectively mounted on the input and output shafts, an idler gear which is axially slidable on the idler shaft, a folk shaft which is slidably supported in a parallel relationship with the idler shaft from the housing assembly and is operatively connected to a manual shift lever which is selectively shifted from its neutral position to a forward or reverse position, a detent mechanism mounted on the housing assembly for selectively rataining the fork shaft in its neutral and shifted positions under a resilient load acting thereon, a shift head member which is slidable on the fork shaft, a one-way engagement mechanism for effecting the engagement of the shift head member with the fork shaft through the axial movement of the fork shaft toward and away from its reverse position, and a shift arm member pivoted to the inner wall structure of the housing assembly and linked with the shift head member, wherein the idler gear is carried by the shift arm member to be retained in its neutral position and to be engaged with the driving and driven gears through axial movement of the fork shaft to its reverse position.

The reverse gear is usually constructed so that it is unsynchronized. Therefore, even after the vehicle comes to a complete stop, the input shaft, which runs into the transmission, is still rotating because of inertia. Hence, if an operator shifts into reverse while the input shaft is still rotating, a grinding noise may originate in the transmission resulting from the engagement between a rotating reverse drive gear, which is connected to the input shaft, and a stationary reverse idler gear. This results in discomfort to the operator and undesired wear on the gears.

SUMMARY OF THE INVENTION

The present invention was made in view of the foregoing background and to overcome the foregoing drawbacks. It is accordingly an object of this invention to provide an improved manual transmission unit for use in a vehicle.

To attain the above objects, a vehicle having an engine and a manual transmission unit in accordance with the present invention comprises:
a housing assembly;
an input shaft connected to the engine;
an output shaft supported in a parallel relationship to the input shaft within the housing assembly;
a forward input gear integral with the input shaft;
a forward output gear rotatably mounted on the output shaft and constantly meshing with the forward input gear;
synchronizing means which are slidably mounted on one of the input and output shafts and rotatable therewith, the synchronizing means including a clutch means and a positive coupling means which engages the forward input or output gear;
first actuating means for shifting the synchronizing means toward or away from one of the forward input or output gears;
a reverse input gear integral with the input shaft;
an idler shaft supported in a parallel relationship with the input and output shafts within the housing assembly;
a reverse sliding gear mounted on the idler shaft;
a reverse output gear mounted on the output shaft;
second actuating means for shifting the reverse sliding gear into meshing engagement with the reverse input and output gears;
a manual shift lever for changing gearing ratios between the input shaft and output shaft;
a fork shaft slidably supported in a parallel relationship with the idler shaft from the housing assembly and operatively connected to a manual shift lever which is selectively shifted by the operator between its neutral, forward and reverse positions;
a detent mechanism mounted in the housing assembly to selectively retain the fork shaft in its neutral or shifted positions when subjected to a resilient load acting thereon, the detent mechanism comprising a holder member slidable on the fork shaft and rotatable relative to the housing assembly, the holder member whose rotation results in the movement of the synchronizing means, the member having a first projection and a hole for allowing the rotation of the holder member when sifting into reverse gear; and
rotating means rotatable by the manual shift lever, having a second projection, the second projection engaged with the first projection when the holder member slides upon shifting into reverse gear, whereby the rotation of the manual shift lever results in the rotation of the holder member because of the engagement between the first projection and the second projection, resulting in the coupling of the synchronizing means.

BRIEF DESCRIPTION OF THE DRAWINGS

The above objects, features and advantages of the present invention will become more apparent from reading the following description of the preferred embodiments taken in connection with the accompanying drawings wherein.

DETAILED DESCRIPTION OF THE PREFERRED EMBODIMENTS

The present invention is described in detail with reference to the accompanying drawings which illustrate different embodiments of a manual transmission unit for use in a vehicle in accordance with the present invention.

Figure 1:
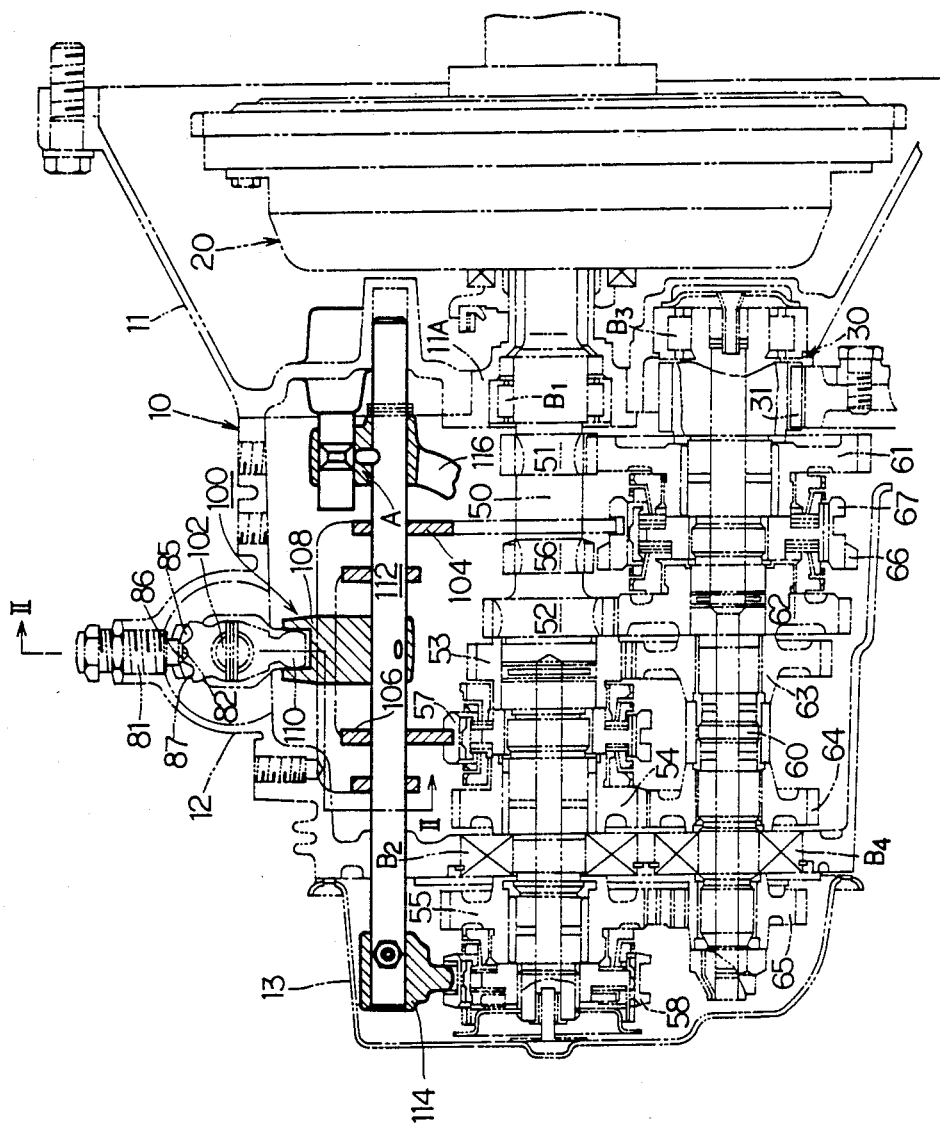
FIG. 1 illustrates an arrangement of a gear-shift mechanism for a manual transmission unit in accordance with the present invention.

FIG. 1, illustrates an arrangement of a gear-shift mechanism 100 in a transmission unit which includes a housing assembly 10 composed of a trans-axle casing 11, a transmission casing 12 and a cover plate 13. The trans-axle casing 11 is secured to the cylinder block of a transversely mounted internal combustion engine by its right end seating face and contains a clutch assembly 20 therein. The transmission casing 12 is secured to the trans-axle casing 11 at its right end seating face in a fluid-tight manner and carries thereon a final drive gear 30 which is located adjacent to the lower portion of the clutch assembly 20. The left end of the transmission casing 12 is closed and sealed by the cover plate 13 to retain lubricating oil within the housing assembly 10.

Assembled within the housing assembly 10 is an input shaft 50 which is coaxially arranged with an output member of the clutch assembly 20 in a parallel relationship with an output shaft 60. The input shaft 50 is supported by a pair of axially spaced bearings $B_1$ and $B_2$. The bearing $B_1$ is located in the casing 11 and the bearing $B_2$ is located in the transmission casing 12. The input shaft 50 is provided with forward driving gears 51–55, a reverse driving gear 56, and hub sleeves 57 and 58 for third/fourth and fifth gears respectively. The bearing $B_1$ is held in place by a bearing retainer 11A.

The output shaft 60 is supported by a pair of axially spaced bearings $B_3$ and $B_4$. The bearing $B_3$ is located in the trans-axle casing 11 and the bearing $B_4$ is located in the transmission casing 12. The output shaft 60 is provided with first through fifth speed driven gears 61–65, a reverse driven gear 66 and a hub sleeve 67 for first-/second gears. The output shaft 60 is further provided thereon with a pinion 31 of the final drive gearing 30.

Figure 2:
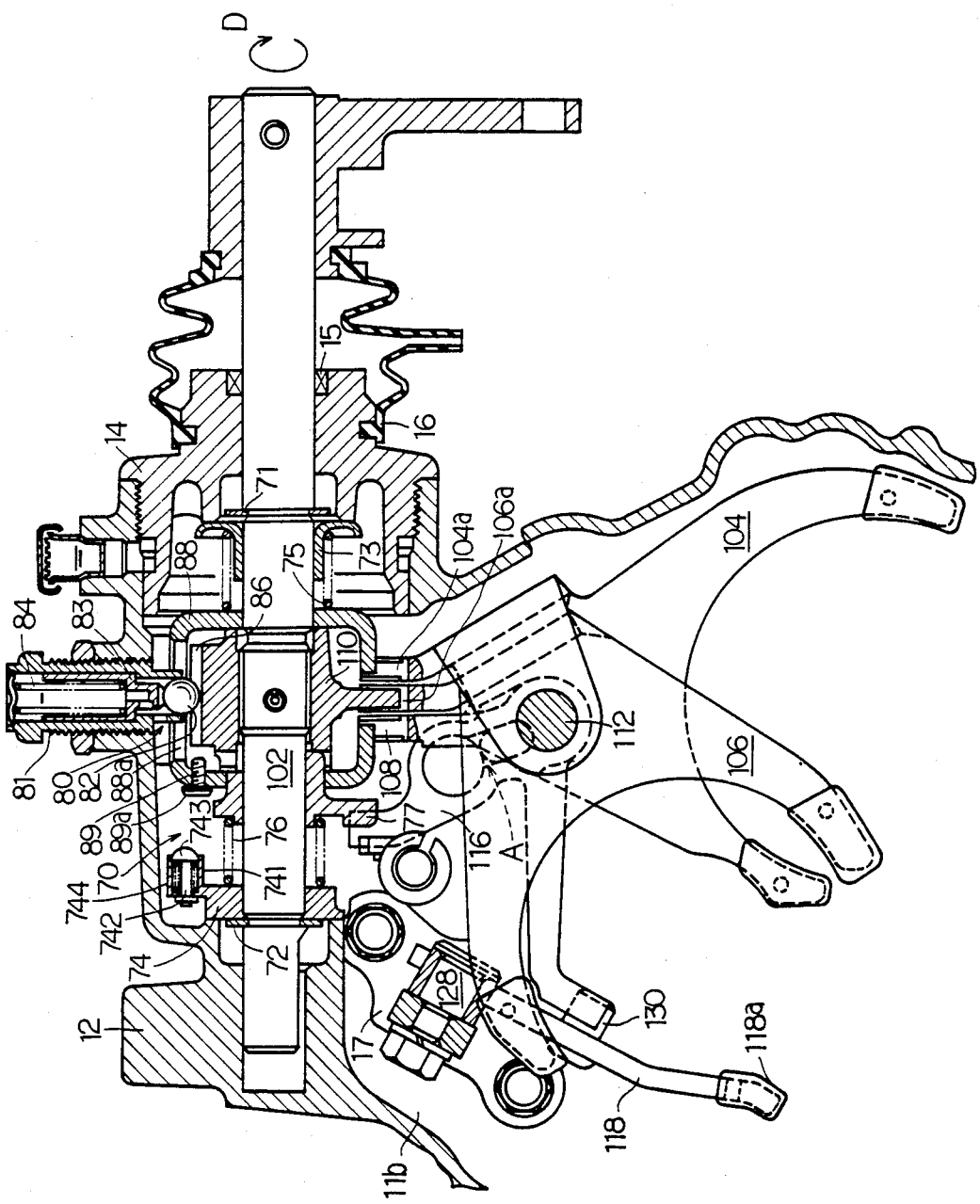
FIG. 2 is an enlarged sectional view taken along the line II—II of FIG. 1.

Assembled within the upper portion of the transmission casing 12 is a shift-and-select shaft 102 of the gear-shift mechanism 100 for changing the gear ratio between the output and input shafts 60 and 50. FIG. 2 shows an enlarged side view of the aforementioned assembly. The shift-and-select shaft 102 is integrally provided with an inner lever member 110 which is selectively brought into engagement with each head of shift forks 104, 106 and a shift head 108. The shift and select shaft 102 both rotates and slides within the transmission casing 12 and the cover member 14, which act as supports for the shaft. The shift-and-select shaft 102 is threaded through the transmission casing 12 in a fluid-tight manner, and extends outwardly from the cover member 14 by utilizing an oil seal member 15 and a dust boot 16. The end of shaft 102 which extends through the cover member 14 is operatively connected through a shifting linkage (not shown) to a manual shift lever which causes axial displacement of the shaft 102 in the selecting operation and a rotation of the shaft 102 in the shifting operation. The shift-and-select shaft 102 is further provided with a select return mechanism 70 and a detent mechanism 80.

The select return mechanism 70 retains the manual shift lever in its neutral position. The select return mechanism 70 includes a pair of axially spaced fasteners 71 and 72 fixed to the shaft 102, a pair of axially spaced spring holders 73 and 74 slidable on the shaft 102, a pair of axially spaced compression coil springs 75 and 76 which circumferentially surround the shaft 102, and a reverse restriction lever 77. The spring holder 74, which has a spline relationship with the shaft 102 and is therefore rotatable with the shaft 102, extends radially outward to form a flange 741 in which a shaft 742 having an enlarged head portion 743 is provided. A compression coil spring 744 provided in the flange 741 biases the shaft 742 in a direction toward the right side of FIG. 2. The spring holder 74 is connected to the shaft 102 by the fastener 72 which provides for free movement of the holder 74 with the shaft 102 when shifting into first or second gear, which corresponds to the shaft 102 moving toward the right in FIG. 2. However, when the shaft 102 is moved for shifting into fifth or reverse gears, corresponding to movement to the left in FIG. 2, the spring holder 74 freely moves with the shaft 102 until the spring holder 74 abuts against the inner wall of the transmission casing 12. The reverse restriction lever 77 acts as a stopper for the select return mechanism 70 and in a conventional manual transmission, prevents an accidental shifting into reverse gear. The select return mechanism 70 retains the shift and select shaft 102 in its neutral position to maintain the engagement between the inner lever member 110 with the head of the shift fork 106 when shifting between third and fourth gears.

Figure 3:
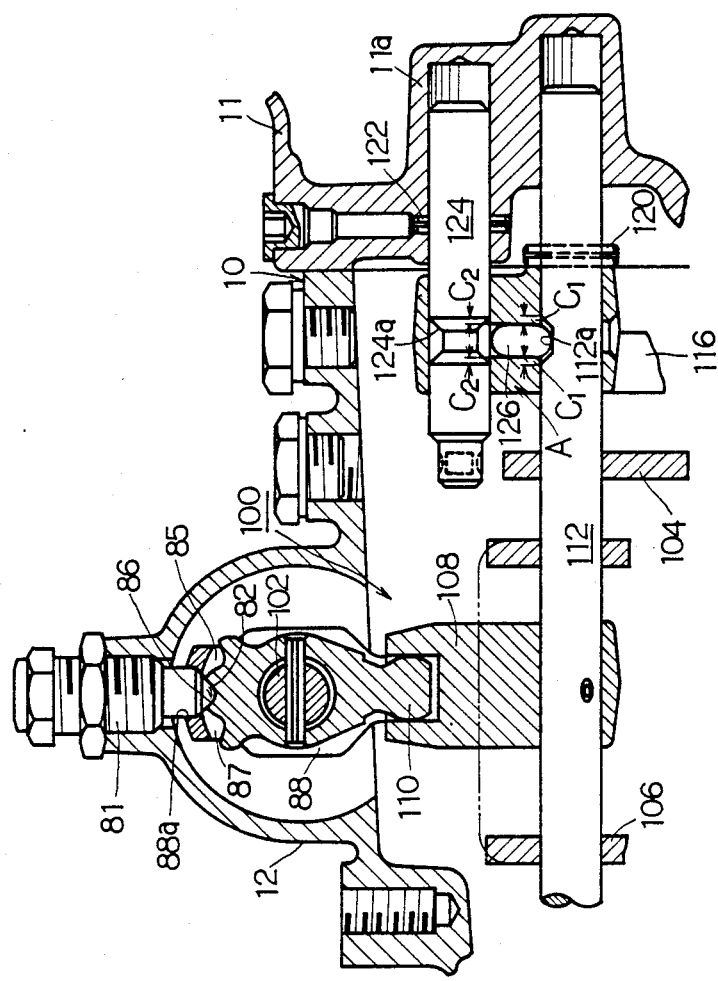
FIG. 3 is an enlarged sectional view illustrating a portion of FIG. 1.

The detent mechanism 80 is shown in FIGS. 1, 2 and 3. The detent machanism comprises a cylindrical plug member 81 which is threaded into the transmission casing 12, a metallic ball 82 assembled within the inner end portion of plug 81 and rotates therein, a cylindrical ball retainer 83 which axially slides within the plug 81 and retains the ball 82 in place, and a compression coil spring 84 assembled within the plug 81 which presses the ball 82 toward the inner lever member 110. The head of the inner lever member 110 comprises three equiangular, equally spaced axial detent grooves 85, 86 and 87 wherein the ball 82 is selectively retained per the resultant load from the spring 84. The axial detent grooves 85, 86 and 87 are parallel with the longitudinal axis of shaft 102. The detent mechanism 80 further comprises a holder member 88 which is mounted on the shaft 102 and rotates and slides thereon.

Figure 5:
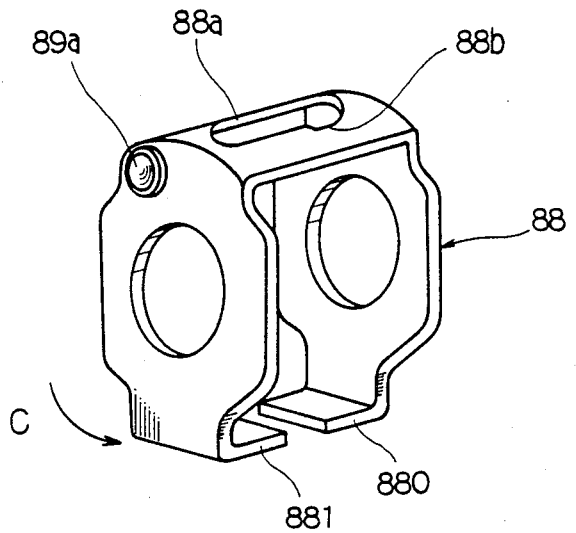
FIG. 5 is a perspective view illustrating a holder member having a hole in its upper portion.
Figure 7:
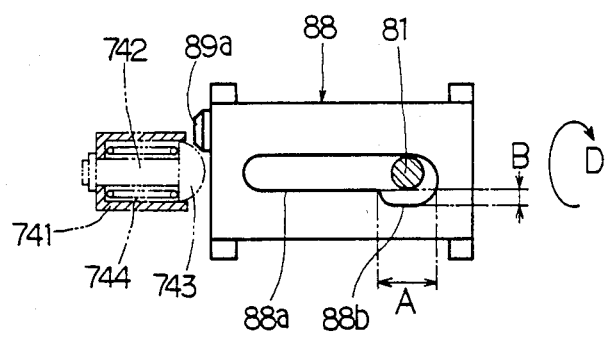
FIG. 7 is a schematic indicating the engagement between the first and second projections when in fifth gear.
Figure 9:
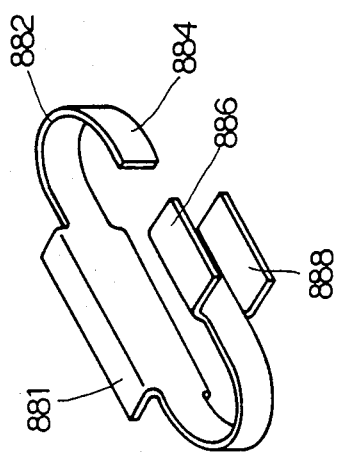
FIG. 9 is a perspective view of a guide member which fits into the hole of the holder member.
Figure 8:
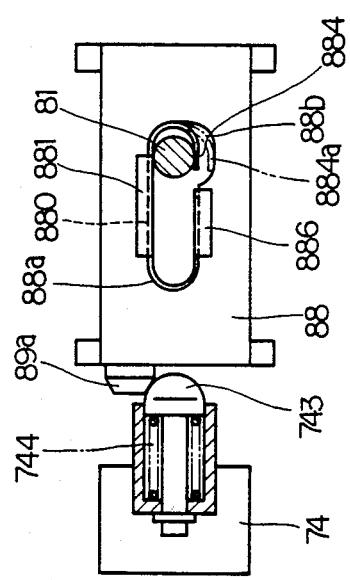
FIG. 8 is a schematic indicating the engagement between the first and second projections when in fifth gear in accordance with the second embodiment.
Figure 10:
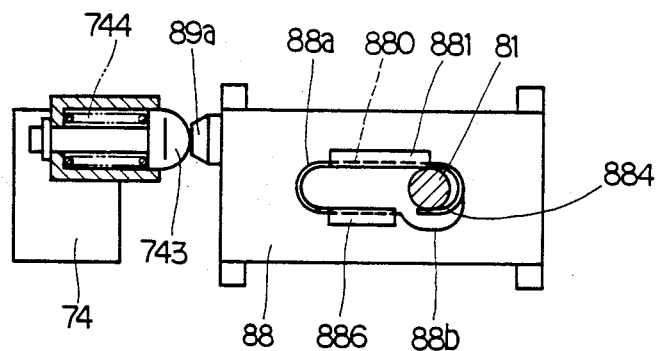
FIG. 10 is a schematic indicating the engagement between the first and second projections rotated from the condition shown in FIG. 8.

The holder member 88 is shown in more detail in FIGS. 5 and 7. The holder member 88 has an axial slot 88a–88b machined into it through which the inner end of the plug 81 extends, thereby restricting the rotation of the holder member 88. A screw 89, having an enlarged head portion 89a, is threaded into the holder member 88 near the 88a side of the machined axial slot 88a–88b. When the manual shift lever is shifted into either reverse or fifth gear, the holder member 88 moves axially with the shaft 102 toward the head portion 743 of the shaft 742, thereby compressing the spring 76, resulting in the engagement between the head portion 743 and the holder member 88. Therefore, when the head portion 743 is engaged with the enlarged head portion 89a of the screw 89, the rotation of the shaft 102 is transmitted to the holder member 88 through the spring holder 74.

Figure 6:
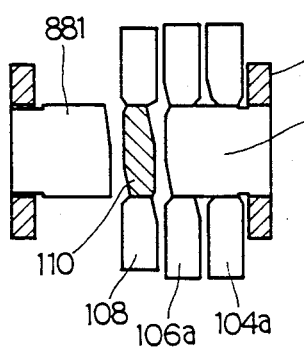
FIG. 6 is a schematic illustrating the engagement between locking pawls of the holder member and shift heads of fifth or reverse gears.

The end 88b of the slot 88a-88b is larger than the 88a end of the slot by an amount A in the slot's longitudinal direction and an amount B in the slot's transverse direction, as disclosed in FIG. 7. This permits the holder member 88 to rotate in the direction D an amount equipment to B without any corresponding rotation of the shaft 102. When the holder member 88 rotates with the shaft 102 in the direction C, shown in FIG. 5, the pawls 880 and 881 of the holder member 88 rotate the shift heads 104a and 106a, as shown in FIG. 6. This movement causes the hub sleeves 57 and 67 to function as a synchronizer. The undesirable effects of double shifting the gears 64 and 62, corresponding to the hub sleeves 57 and 67 respectively, is thereby prevented so long as the appropriate length B for preventing the double shift is predetermined.

When the holder member 88 is caused to rotate more than the length B, through the rotation of the shaft 102, the head portion 743 of the shaft 742, engaged with the head portion 89a of the screw 89 is caused to disengage against the force of the coil spring 744. After the disengagement, the shaft 102 is rotatable relative to the holder member 88. However, when the plug 81 is positioned in the narrow hole 88a, the holder member 88 cannot be rotated because there is not enough space provided between the plug 81 and the inner wall of the hole 88a. In this situation, the holder member 88 is positioned by the opposing forces exerted by the compression coil springs 75 and 76 thereby restricting the axial movement of the shift fork 104 and the shift head 108 along the fork shaft 112. Therefore, the detent mechanism 80 defines each neutral and shifted position of the shift forks 104 and 106 and the shift head 108. The shift head 108 is mounted on the fork shaft 112 which receives axial slidable support from the trans-axle casing 11 and the transmission casing 12. The fork shaft 112 is displaced axially in the shifting operation of moving the shift lever toward the fifth speed position or the reverse position and is positioned in its shifted state through the operation of the detent mechanism 80.

Referring next to FIGS. 8 through 11, a guide member 880 which is placed into the holes 88a and 88b of the holder member 88 for guiding the plug 81 is shown. The guide member 880 comprises the flange portions 881, 886 and 888, which grip the slot formed in the holder member 88 and the resilient portions 882 and 884 for pressing the plug 81 onto the flange portion 881. When any gear except reverse is selected, the position of the guide member 880 is represented by the solid line shown in FIG. 8 which shows the relative positioning of the members when in the fifth gear. When the gears are shifted from fifth to fourth, the holder member 88 slides toward the cover member 14, which corresponds to sliding to the right in FIGS. 7, 8, 10 and 11. During this movement, the plug 81 does not contact the enlarged portion 88b of the slot 88a-88b because of the resilient force exerted upon it by the guide member 880. However, when reverse gear is selected, the holder member 88 slides from its neutral position in a direction corresponding to movement toward the left in FIGS. 7, 8, 10 and 11 and is rotated into the enlarged portion 88b of the slot 88a-88b, against the resilient force of the guide member 880.

Figure 11:
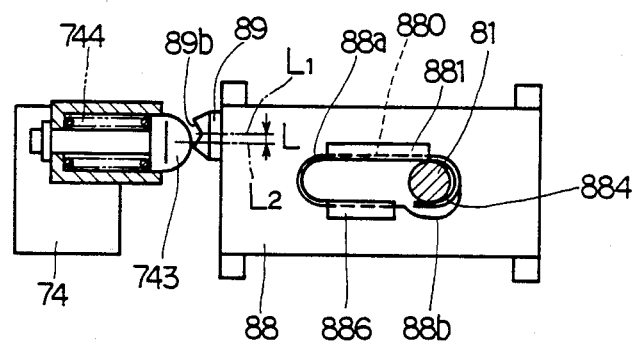
FIG. 11 is a schematic indicating the engagement between the first and second projections according to the present embodiment.

The head portion 89b of the screw 89 shown in FIG. 11, is provided with an indented cone head, whose longitudinal center L1 is displaced a distance L from the center line of the head portion 743. The result of this arrangement is that the holder member 88 can be easily returned to the neutral position by the head portion 743 being forced by the spring 744 into the indented cone head 89b of the screw 89.

The gear-shift mechanism 100 comprises the shift-and-select shaft 102, the shift forks 104 and 106, the shift head 108, the inner lever member 110, the fork shaft 112, a shift fork 114 fixed to the left end of the fork shaft 112 for a fifth gear, a reverse shift head member 116 connected to the fork shaft 112 through a one-way engagement mechanism A, and a shift arm 118 linked with the reverse shift head member 116. The one-way engagement mechanism A comprises a spring pin 120 fixed to the fork shaft 112 and designed so that it abuts against the right end of the reverse shift head member 116 as shown in FIGS. 1 and 3. The fork shaft 112 is provided with an annular recess 112a, and a guide shaft 124 is also provided with an annular recess 124a. The guide shaft 124 is provided in the 11a portion of the trans-axle casing 11 in a parallel relationship with the fork shaft 112, and is held in place by a spring pin 122. The one-way engagement mechanism A further comprises a lock pin 126 which has radial movement capabilities within the head portion of the member 116 to selectively engage the annular recess 112a or 124 thereby effecting engagement between the reverse shift head member 116 with the fork shaft 112 or the guide shaft 124. By utilizing the construction of mechanism A, the reverse shift head member 116 is connected with the guide shaft 124 when the fork shaft 112 is shifted toward and away from the fifth gear engagement position. When the fork shaft 112 is shifted toward and away from the reverse gear engagement position, the reverse shift head member 116 is connected with the fork shaft 112 and is simultaneously shifted. It is noted that the axial clearances $C_1$ and $C_2$ between the lock pin 126 and the annular recesses 112a and 124a are provided to avoid any failure in the assembly due to errors in the manufacturing processes.

Figure 4:
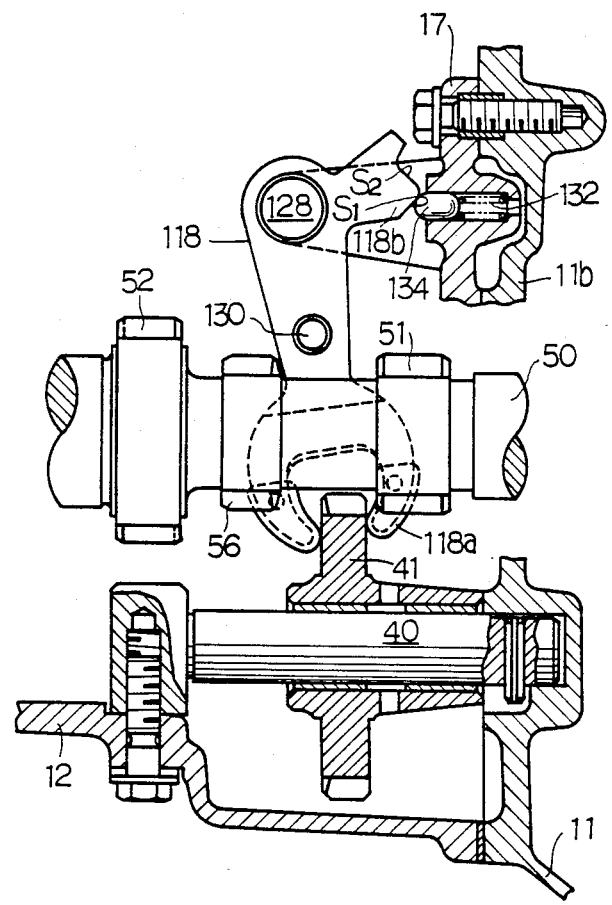
FIG. 4 is an enlarged sectional view illustrating the main portion of the gear-shift mechanism in its neutral position.

FIGS. 2 and 4 show that the shift arm 118 pivots about a pin 128 which is fixed on a bracket 17 which in turn is bolted to the vertical wall 11b of the trans-axle casing 11. The shift arm 118 is provided with a support pin 130 near the transverse and longitudinal centers of the arm 118, which is connected to the reverse shift head member 116 which thereby effects the swinging motion of the shift arm 118 when shifting into reverse. The shift arm 118 carries a reverse idler gear 41 at its fork portion 118a. The reverse idler gear 41 slides axially on a reverse idler shaft 40 which is supported by the trans-axle casing 11 and the transmission casing 12. The idler gear 41 can be brought into engagement with both the reverse driving and driven gears 56 and 66 respectively. When the reverse shift head member 116 is in its neutral position as shown in FIGS. 1 and 3, the shift arm 118 is in its neutral position and thereby retains the reverse idler gear 41 in its disengaged position as shown in FIG. 4. When the reverse shift head member 116 is shifted toward the reverse position, the shift arm 118 swings to effect the engagement between the reverse idler gear 41 with the reverse driving and driven gears 56 and 66.

In this embodiment, the shift arm 118 is designed with a cam portion 118b which is engaged with a cam follower 134 which is movable within a portion of the bracket 17. The cam follower 134 is loaded by a compression coil spring 132 within the bracket 17 which forces the cam follower 134 toward the cam portion 118b of the shift arm 118. FIG. 4 shows that there are two faces $S_1$ and $S_2$ provided on the cam portion 118. When the cam follower 134 engages the face $S_1$, the shift arm 118 is in its neutral position, and when the cam follower 134 engages the face $S_2$, the shift arm 118 is in its reverse position. In reference to FIG. 4, the shift arm 118 experiences a counterclockwise force when the face $S_1$ is engaged with the cam follower 134 and a clockwise force when the face $S_2$ is engaged with the cam follower 134 because of the load exerted by the spring 132 through the cam follower 134. The actual force exerted upon the shift arm 118 is determined by the angle formed between the cam follower 134 and the faces $S_1$ and $S_2$ along with the stored force in the coil spring 132.

In this embodiment, the load on the shift arm 118 is designed to be less than that acting on the inner lever member 110 of the detent mechanism 80. Therefore, when the reverse shift head member 116 is in its neutral position or shifted away from its reverse position, the force acting upon the shift arm 118 is less than the force acting on the inner lever member 110 of the detent mechanism 80, but sufficient to separate the reverse idler gear 41 from both the reverse driving and driven gears 56 and 66. When the reverse shift head member 116 is shifted to the reverse position, the load acting upon the shift arm 118 is less than the load acting upon the inner lever member 110, but sufficient to effect the engagement of the reverse idler gear 41 with the reverse driving and driven gears 56 and 66. Additionally, the reverse idler gear 41 abuts against the inner wall of the trans-axle casing 11 when the reverse shift head member 116 is in its neutral position, as shown in FIG. 4.

In the operation of the gear-shift mechanism 100, when the shaft 102 is slid by the manual shift lever from its neutral position, shown in FIG. 2, to its first gear position, the inner lever 100 becomes engaged with the shift head 108, and the first shift fork 104 is moved on the fork shaft 112 by the rotation of the shaft 102. Consequently, the hub sleeve 67 of the first synchronizing mechanism performs the synchronizing function, whereby the rotation of the input shaft 50 results in the subsequent rotation of the output shaft 60 by utilizing the first speed gear 51 and the first driven gear 61.

Further, second speed is achieved through the opposite movement of the hub sleeve 67 from that movement necessary to achieve first gear. Therefore, the rotation of the input shaft 50 is transmitted to the output shaft 60 through the meshing relationship between the second speed gear 56 and the second driven gear 62.

Third gear is achieved as follows. The inner lever 110 is rotated from its neutral position, shown in FIG. 2, in the same rotation direction needed to achieve first gear, thereby causing the shift fork 106 to slide on the fork shaft 112. Consequently, the hub sleeve 57 of the second synchronizing mechanism performs the synchronizing function, and thereafter the rotary movement of the third speed gear 53, connected to the input shaft 50, is transmitted to the output shaft 60 through the third driven gear 63.

Fourth gear is attained through the opposite movement of the shaft 102 from the movement needed to attain third gear. This displacement of the shaft 102 results in transferring the rotation of the fourth speed gear 54, connected to the input shaft 50, to the fourth speed driven gear 64, after proper synchronization of the hub sleeve 57. The rotation of the gear 64 is further transmitted to the final driving gear 30 through the output shaft 60.

To attain the highest or fifth speed gearing of the transmission, the shaft 102 is moved from its neutral position of FIG. 2 in a direction corresponding to motion toward the left side of FIG. 2, with the inner lever 110 engaged with the shift head 108. The locking pawls 880 and 881 of the holder member 88 are disclosed in their shifted state in FIG. 6. By utilizing the aforementioned conditions, the shaft 102 rotates to move the hub sleeve 58 thereby connecting the fifth speed gear 55 to the fifth driven gear 65. The rotation of the gear 65 is transmitted to the final driving gear 30 through the output shaft 60.

Finally, to attain the unsynchronized reverse speed gear, the shaft 102 slides from its neutral position of FIG. 2 toward the left side of FIG. 2, by utilizing the shift lever in a manner similar to shifting into fifth gear. This movement results in the head portion 89a of the shaft 89, which is fixed to the holder member 88, striking the head portion 743 of the shaft 742 mounted on the flange 741, as disclosed in FIG. 7. The shaft 102 is subsequently rotated in the direction D, in FIGS. 2 and 7, by the shift lever to shift into reverse gear. When the shaft 102 is rotated in the direction D, the flange 741 of the spring holder 74 also rotates in the same direction as the shaft 102 because the spring holder 74 is connected with the shaft 102 by a spline. When the flange 741 is rotated in the direction D, the head portion 743 of the shaft 742 mounted on the flange 741 rotates the holder member 88 in the direction D because of the engagement between the head portion 743 and the head portion 89a. When engaged, the holder member 88 can be rotated by an amount corresponding to the length B of the hole 88b in FIG. 7. When the holder member 88 is rotated, the locking pawls 880 and 881 of the holder member 88 rotate in the direction C shown in FIG. 5. When the locking pawl 880 rotates the shift head 104a and 106a, the hub sleeves 67 and 57 move in a leftwardly direction when referring to FIG. 1, thereby resulting in the synchronization of gears.

The length B of the hole 88b is designed to attain the synchronization of gears, thereby avoiding the potential double shift. This synchronization is only achieved by the rotation of the holder member 88. The rotation of the input shaft 50 is thereby decreased by the synchronization. When the holder member 88 is rotated by an amount corresponding to the length B in FIG. 7, the head portion 743 rotates in the direction D, in FIGS. 2 and 7, by an amount more than that allowed by the length B, through the rotation of the shaft 102. This results in the engagement between the head portion 743 and the head portion 89a being dissloved against the force of the spring 744 in the flange 741. Therefore, the flange 741 of the spring holder 74 now freely rotates with the rotation of the shaft 102. Consequently, the rotation of the shaft 102, governs the motion of the reverse shift fork 116, which is actuated by the shift head 108 causing the shift arm 118 to pivot about the pin 128. The movement of the shift arm 118 results in the reverse idler gear 41, mounted on the reverse idler shaft 40, sliding into a meshed relationship with the reverse drive gear 56, mounted on the input shaft 50, and the reverse driven gear 66. Thus, the rotation of the input shaft 50 is transmitted to the output shaft 60 in a reversed direction.

While the present invention has been described in its preferred embodiments, it is to be understood that the invention is not limited thereto and may be otherwise embodied within the scope of the following claims.

What is claimed is:

1. A gear-shift mechanism for a manual transmission unit for use in a motor vehicle, comprising:
   a housing assembly;
   an input shaft for connection to an engine;
   an output shaft supported in a parallel relationship to the input shaft within the housing assembly;
   a forward input gear integrally attached to the input shaft;
   a forward output gear rotatably mounted on the output shaft and constantly meshing with the forward input gear;
   synchronizing means which are slidably mounted on one of the input and output shafts and rotatable therewith, said synchronizing means comprising a clutch means and a positive coupling means which engages the forward output gear;
   first actuating means for shifting the synchronizing means toward or away from one of the forward input or output gears;
   a reverse input gear integral with the input shaft;
   an idler shaft supported in a parallel relationship with the input and output shafts within the housing assembly;
   a reverse sliding gear mounted on the idler shaft;
   a reverse output gear mounted on the output shaft;
   second actuating means for shifting the reverse sliding gear into meshing engagement with the reverse input and output gears;
   a manual shift lever for changing gearing ratios between the input shaft and the output shaft;
   a fork shaft slidably supported in a parallel relationship with the idler shaft from the housing assembly and operatively connected to the manual shift lever for being selectively shifted by the operation between its neutral, forward and reverse positions;
   a detent mechanism mounted in the housing assembly to retain selectively the fork shaft in its neutral or shifted positions when subjected to a resilient load acting thereon, the detent mechanism comprising a holder member slidable on the fork shaft and rotatable relative to the housing assembly, rotation of the holder member resulting in the movement of said synchronizing means, the holder member having a first projection and a slot for permitting the rotation of the holder member when shifting into reverse gear; and
   rotating means rotatable by the manual shift lever, having a second projection, the second projection engaged with the first projection when the holder member slides upon shifting into reverse gear, rotation of the manual shift lever resulting the rotation of the holder member because of the engagement between the first projection and the second projection, resulting in coupling of the synchronizing means.

2. The gear-shift mechanism of claim 1, wherein the movement of the manual shift lever is transmitted to the fork shaft and rotating means by a shift-and-select shaft connected with the manual shift lever at one end thereof, and a second end of the shaft penetrates the holder member and is in a spline relationship with the rotating means at said second end of the shaft.

3. The gear-shift mechanism of claim 2, wherein the detent mechanism further comprises a locking means fixed onto the housing assembly for restricting the rotation of the holder member, with the locking means projecting into the slot of the holder member.

4. The gear-shift mechanism of claim 3, wherein the slot of the holder member comprises a first hole in which the locking means is slidable with the sliding motion of the shift-and-select shaft, and a second hole in which the holder member can be rotated a limited amount to effect the synchronization of the synchronizing means.

5. The gear-shift mechanism of claim 4, wherein the rotating means comprises an inner portion in a spline relation with the shift-and-select shaft, a flange portion extending radially outward from the inner portion, a shaft with an enlarged head portion, and means for biasing the enlarged head portion toward the first projection of the holder member.

6. The gear-shift mechanism of claim 5, wherein the detent mechanism further comprises return springs which are provided between the shift and select shaft and the holder member, retaining the fork shaft in its neutral position.

* * * * *